June 7, 1932.  A. E. SPINASSE  1,861,761
METHOD OF AND APPARATUS FOR DRAWING GLASS
Filed May 4, 1922
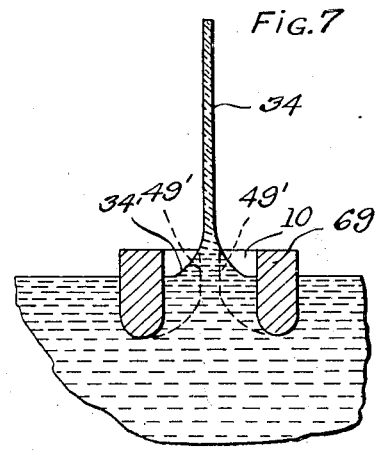
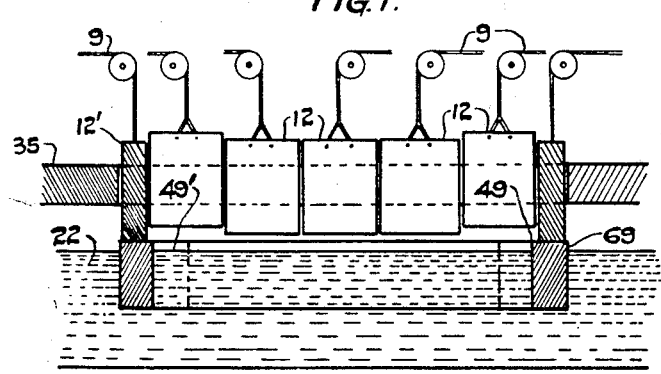
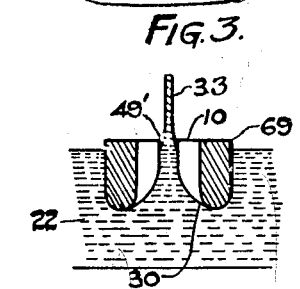
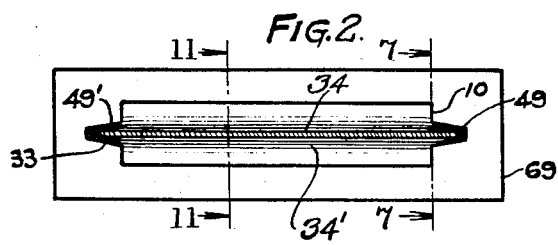
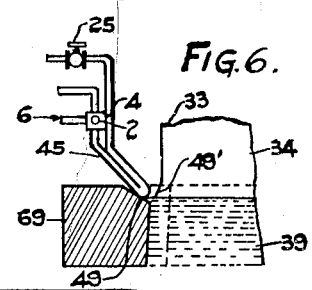
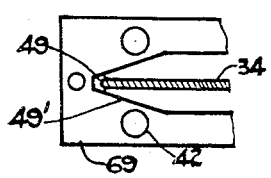
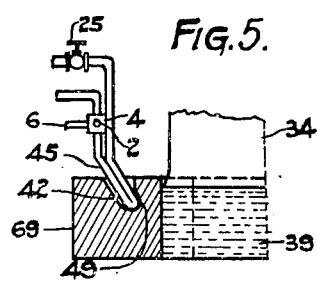
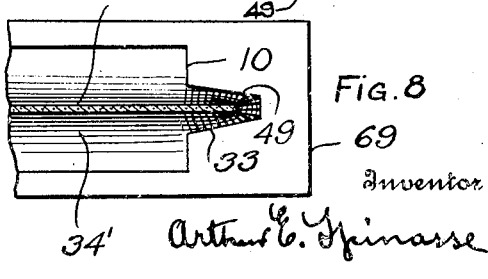
Inventor
Arthur E. Spinasse Patented June 7, 1932

1,861,761

UNITED STATES PATENT OFFICE

ARTHUR E. SPINASSE, OF MOUNT VERNON, OHIO, ASSIGNOR TO PITTSBURGH PLATE GLASS COMPANY, A CORPORATION OF PENNSYLVANIA

METHOD OF AND APPARATUS FOR DRAWING GLASS

Application filed May 4, 1922. Serial No. 558,547.

My invention relates to an improved method of and certain apparatus for drawing glass objects, and is more particularly directed to the drawing of glass sheets or plates. The object of my invention is a process adapted to simplify and improve the method of producing continuous or intermittent sheet glass, to provide adequate means of regulating and effecting production, to reduce the manufacturing cost and to improve the qualities of the product. My invention also involves specially designed means for carrying out my process.

One of the objects of my invention is the imposition of certain conditions of use and of methods of drawing glass articles, particularly continuous sheets, from a temperature regulated glass pool or stratum; it comprises segregating a pool or portion of glass from a mass of molten glass contained in a tank furnace, and consists in modifying and controlling the temperature of the walls of the segregating member at desired points with respect to the mass of molten glass and furnace heat, while said member is maintained immersed at suitable depth in said mass; whereby, the temperature and viscosity of the pool on portion of glass may be locally modified and controlled in suitable degree at desired or predetermined points, at or below the surface of the pool or portion of glass, to effect desired results.

It further consists in shielding and protecting, in desired predetermined measures, at least the inner portion of the segregating member from the furnace heat and from the heat radiation of the highly fluid glass therein, thereby obtaining the essential relatively low temperature of the segregating members with respect to said heat and glass, which enables me to modify and regulate the temperature and viscosity of the segregated pool or portion of glass at desired points. It further consists in properly protecting the glass sheet from the melting heat of the furnace, enabling proper drawing to take place, which protection, with the means provided, consists in locally modifying and controlling the degree of shielding of the zone of the draw or sheet glass drawn, at desired or predetermined points, so as to obtain the desired effects and especially uniformity of thickness or walls of the sheet or glass articles drawn.

In my present glass sheet drawing process, I create a pool of glass of proper homogeneity in a mass of molten glass, by modifying and regulating its temperature and viscidity at desired points, preferably at points beneath the surface of the pool and as the glass approaches the surface or drawing area, I maintain immersed in the glass mass a segregating refractory member of special form, providing positive means to vary and regulate the temperature of its walls at desired points, and hence temperature and viscidity of the glass pool at such points. This enables me to establish in the segregating ring or member at desired places, points or anchorage, to which the generating edges as such, of the sheet, may be held or be adherently drawn from the viscid glass fed at such points. I make the anchoring points small, so small as to, in some cases, extend only the thickness of the sheet or plate drawn, so that during draw, there is comparatively reduced tendency of the sheet to form thick and thin, causing the sheet to form with edges of approximately the same thickness as the sheet body portions.

I aim to produce for the sheet itself throughout its extent uniformity of condition, and to keep the sheet stretched laterally by means of the anchoring relation of the sheet edges forming glass portions, to the comparatively small anchoring points locally and precisely controlled to the end indicated. The sheet I form is thus substantially of even thickness, texture and transparency throughout, and substantially even in width. The form and dimensions of the anchoring points and temperature regulation, control the intensity of the anchorage between said points and the viscid glass forming the sheet edges either held or in adherent contact therewith.

In effecting my process I create proper conditions of thermal control between the segregating member and the top or drawing opening of the drawing furnace thereabove, so that the furnace may be kept at relatively high melting temperature to maintain purity of glass, and the zone where drawing takes place reduced to proper drawing temperature protected from said high temperature and from the heat of the surrounding molten glass within the furnace. Therefore it comprises properly shielding the zone of draw from the comparatively high temperature within the furnace, so that the relative temperatures of either the furnace or drawing zone may be modified or regulated as required at desired points, and will not interfere with the proper operation of one with respect to the other during drawing; also, to properly protect the segregated glass portion and inner part of the refractory ring or member from said furnace heat, effecting the necessary temperature conditions between the member and the segregated portion of glass in their various portions; permitting proper relative temperature regulation of the member, and viscidity of the segregated portion of glass at different points or depths with respect to the furnace heat during drawing. This enables me to obtain the required viscidity and adherence of the marginal portion of glass from which the sheet edges are drawn, at points adjacent to or in contact with the temperature regulated walls of the segregating member at or beneath the surface, causing each successive portion of the sheet drawn to become drawn adherent to said viscid glass and walls of the member. I am thus enabled to obtain an anchorage sufficient to maintain the width of the sheet, and, what is important, to resist material shrinkage of the sheet portion between the edges during drawing, thus obtaining a glass sheet free from lines or similar blemishes.

I provide means whereby the intermediate portion of the sheet may be drawn without close contact with forming walls at the surface of the glass, and provide anchoring members, or segregating element or means, such that the sheet edges or margin portions thereof may be drawn in substantially finished reduced drawn thickness, from upwardly supplied portion of the glass greatly diminished in breadth and in close adherent forming contact between closely spaced refractory walls extending into the glass bath.

In the accompanying drawing:

Figure 1 is a vertical sectional view showing a series of shield members in combination with a desirable elongated glass segregating or sheet edge forming member, each shield being adjustable so as to permit varying the temperature locally and thus regulate drawing temperature.

Figure 2 is a top plan view of the elongated segregating ring used in Figure 1, showing the relative positions of the drawn sheet and its edges with respect to the closely spaced portions of end walls.

Figure 3 is a vertical sectional view of the segregating members shown in Figures 1 and 2, and looking towards one end of said members.

Figures 4-6 are fractional views of slight modification of the segregating and sheet edge forming members.

Figure 7 is a transverse section taken substantially on the line 11—11 of Figure 2 and looking in the direction of the arrows, the dotted lines indicating the relative positions of the edge thinning walls, and Figure 8 is a fragmentary enlarged plan view of one end of Figure 2 to better illustrate the invention.

In Figure 1 I show a vertical sectional view of a preferred assemblage of parts, affording means for locally regulating temperature of the glass pool, and anchoring or segregating member, by locally variably exposing or shielding said pool or member or drawn glass to or from the furnace heat at desired points. The elongated glass supplying float 69 projects to or slightly above the surface of the glass and the walls of the member extend vertically into the glass with the parallel walls thereof at or adjacent the surface of the glass remote from close forming contact with the intermediate portion of the sheet at the surface of the glass, but with the ends of said walls closely spaced to each other, preferably to form acute-angled points of anchorage 49 from between which walls the sheet edges and adjacent marginal portions thereof are drawn in substantially finished reduced drawn thickness above said walls. It will be noted in this case that the float member is maintained with its upper edge at or closely adjacent the surface of the glass by suitable means, for example shield members 12'. The purpose of this is to prevent undue cooling of the surface of the glass within said ring at the point of contact therewith to maintain the quality of the glass, at the same time retaining the desired or required degree of viscidity and homogeneity in the segregated portions of the glass to produce a flat sheet glass uniform in thickness and texture. The glass being constantly fed from beneath into member 69, thus avoiding surface floating impurities while the temperature of the top part of the glass within said member may be controlled at will by either admitting or excluding heat from the furnace to or from the drawing zone by means of the independently adjustable shield members arranged transversely of the drawn sheet.

Figure 2 is a top plan view of the elongated member 69 used in Figure 1. It will be seen that the parallel walls between the end portions thereof are remote from close forming contact with the intermediate portion of the drawn glass sheet 34, but that the edges 33 or margin portions of the sheet are being drawn from between closely spaced walls 49' forming the points of anchorage 49. The narrowed space between the closely spaced walls 49' may outwardly extend from 1 to 6 inches, and may vary from ¼" to 3" in width more or less while the depth of the walls may be from 6" to 18" more or less to suit requirement, preferably the glass being fed upwardly through the vertical passage thus formed between said walls from the mass of molten glass beneath with the walls at point 10 preferably abruptly departing from close proximity to the drawn glass, thereby avoiding undue thickness in the margin of the drawn sheet.

Figure 3 is a sectional vertical view on line 7—7 Figure 6 looking toward one end of member 69, showing the edges or margins 33 of drawn sheet 34 taking form in partially reduced drawn thickness from between the closely spaced portions of walls forming the points of anchorage 49. Of course the spaces between these closely spaced walls may be diminished or increased to obtain the desired thickness in the forming drawn sheet borders. I prefer to have the walls of the member to decrease in diameter toward their preferably rounded lower edges 30, thereby providing spaces affording facility for supplying the flow of glass from the molten mass upwardly to the source of generation of the sheet edges between the closely spaced walls at points of anchorage 49 or 49'. Therefore, as clearly shown, the slot in the drag member opens and flares through the side and bottom of the edging member, and opens and is restricted at the top portion of the member to partially reduce the thickness of the thickly drawn marginal portion of the meniscus which forms the sheet. The edging member being spaced above the bottom of the bath so that it may be adjusted to desired position and the walls of the slot extending a substantial distance along the border faces and terminating at the inner marginal portion of the sheet, thereby protecting the rising border from heat of the bath therebeneath.

By referring to Figure 7 it will be clear that the intermediate portion 34 of the sheet is drawn from an open bath and freely from the surface level thereof so that the initially thickly drawn portion of the sheet 34' is unrestricted. The dotted lines show how the border portions of the sheet are reduced or thinned as compared to the intermediate portion of the sheet.

It must be understood that in drawing the sheet glass from a substantially open bath of molten glass, the sheet first normally draws quite thick and tapers upwardly for about 2 or 3 inches above the bath until the sheet acquires its final thickness, ordinarily about ⅛ of an inch thick. Usually, this thickly drawn portion varies from about 1½ to 3 inches at the surface level of the bath at the intermediate portion of the drawn sheet. This thickly drawn portion is sometimes called the "wedge" or "meniscus", and at the initially drawn border portions of the sheet this meniscus still tends to draw in greater thickness producing abnormally thick drawn border portions of the sheet which frequently causes breakage of the drawn glass. In partially lowering the temperature of the glass to create anchorages for maintaining the width of the drawn sheet, the initially thickly drawn border portions of the sheet or meniscus or wedge still tends to draw thicker. I provide means to thin these thickly drawn border portions without interfering with the free natural drawing of the intermediate portion of the sheet. This thinning means preferably also maintains the width of the drawn sheet. The thinning means is in the form of stationary restricted slot members through which said initially thickly drawn border portions of the drawn sheet pass, while leaving at least the intermediate portion of the sheet out of contact with shaping walls at its point of emergence from the surface of the glass bath to thereby retain the good quality of the glass. The fact that the glass adheres to the hot walls of the slots, and that such initially drawn border portions tend to draw in greater thickness than the width of the slots and to fill said restricted slot, which may be merely ½ to 1 inch in width, there is created not only a thinning of the initially drawn border portions of the sheet but also there is maintained the desired width of the sheet due to the anchorage thus secured. This anchorage causes the faces of the initially drawn border portions of the sheet to be continually drawn or dragged over the inner surfaces of the spaced apart walls 49' which form said restricted slots.

Of course, this anchorage or dragging action somewhat retards the movement of the drawn border portions which are thus longitudinally stretched during the drawing of the sheet, this longitudinal stretching of the border portions further assisting in maintaining the width of the drawn sheet above the anchorage points due to the tensioning of the drawn sheet between the stretched edges.

It is clear that by varying the position or the temperature of the slot members that the force of anchorage or dragging action may be varied at will. These slot members may be adjusted by raising and lowering them to dispose the upper edges of the members at the desired height above or to lie within the plane of the surface level of the bath. The partial cooling of the glass in the restricted slots or cooling of the walls of said slots of course is not to destroy adhesion of the glass to the slots but to increase the viscosity of the glass, and thereby to increase the force of anchorage or of the dragging action between the inner surface of the walls of the restricted slots and the glass which is being drawn in adherent contact therewith.

Above the highly heated mass of molten glass in the furnace I provide a roof 35 having a drawing opening within which I provide a series of sectional shade stones 12 and 12' adapted to surround the drawing zone or glass pool 39, said shades being individually movable vertically by means of suitably connected cables 9, and afford means to either exclude or locally admit heat from the furnace in desired degree and at desired points, enabling thus, proper temperature conditions, control of the pool or zone of the draw locally or throughout. As indicated, the sections 12' are lowered to rest upon and steady ring 69 at suitable depth in the glass bath 22, thereby segregating a pool 39 of desired depth. In this case I show the independent local end shields slightly raised to admit heat from the furnace to the glass or forming margin portions of the drawn sheet to avoid undue thickness formation at such points. In this case I omit temperature controlling members 45, relying on said shields of which one may be raised or lowered to modify or regulate the temperature of the anchoring or segregating member or members as well as desired parts of the drawing zone.

In Figure 4, I show a fractional top plan view of a segregating member 69 with acute-angled ends together with side hollow heating pockets 42 extending at or below the surface of the glass for controlling the temperature thereof, from which the sheet margins take form, thereby preventing undue thickness formation in said drawn margins.

In Figure 5, I show a vertical sectional view of a desirable form of segregating member having vertical walls and restricted hollow chambers or pockets 42 extending closely to the points where the extreme side of the edges of the sheet take form; in this case adjacent to the refractory member or members at the points of anchorage 49 between the closely spaced glass supplying walls I place temperature controlling members 45 within said pockets, said members comprising preferably seamless pipes bent as shown to return fluid or provide a circulation of temperature effecting fluid, such as air or water, forced therein, said fluid being controlled by means of valve 25. The diameter of these pipes may vary from ⅛ inch to 1 inch, depending on the result to be obtained. They have suitable thickness of walls and may be rounded or any desired form in cross section. Said pipe or pipes may be suitably mounted in adjustable positions in collar 4 having a screw of pressure 2, and having an arm 6, which may slide to desired positions in any well known support.

The operative ends of the pipes at points 49 may contact with the refractory member or glass, or may set adjacent thereto, the aim being to locally modify or control the temperature of restricted points without undue dispersion of the temperature affecting medium applied, thereby creating the desired degree of anchorage at only the portions of the glass from which the extreme side edges of the sheet take form between the closely spaced walls of said refractory member 69. The temperature controlled pipes 45 rest upon the bottom of the chambers for holding the float or member in desired drawing position.

Figure 6 is a fractional vertical view of a segregating member similar to that shown in Figure 2, and used with a temperature-controlling member 45, such as described in Figure 5, with the exception that in this case said member is used externally with its operative points in contact with or adjacent the refractory member or the extreme outer portions of the narrowed parts of the glass, the refractory wall of member 69 being cut away so that member 45 may be adjusted precisely adjacent the portion of the glass in contact with the refractory walls of said member where the extreme side edges of the drawn sheet take form. It will be clear that the slotted portions in the edging members of Figs. 5 and 6 are of substantially the same general contour and form as that of Figs. 2, 3, 7, and 8. The lower end of the cooling pipe 45 when used is located adjacent to or in contact to the wall of member 69 or to the glass at point 49. This intensifies the viscosity of the glass at the extreme end of the recess so that it renders the glass more tenacious, intensifying the anchorage relation at such point without cooling the glass at the points of departure of the recess where even heat may be applied to insure against unduly thick glass formation. Therefore, it will be clear that the temperature of the glass may be lowered at the end of the recess without causing thick column of glass to be drawn in the edge of the sheet, because of the fact that the edge producing portion of the glass is constrained to pass in restricted narrowed form through the said restricted forming slot or recess. As shown in Fig. 3, the walls of the recess adjacent the surface of the glass partly embrace the sheet edge or margin forming portion of the glass.

While I have shown segregating member 69, it will be clear that I need not necessarily limit myself to such arrangement, as I may make use of independent closely spaced anchoring and sheet edges forming walls adapted to supply glass diminished in breadth from which to draw the sheet edges in reduced drawn thickness, and that many modifications are possible without departing from the spirit of this invention.

Some of the main factors of my present invention consist in drawing the intermediate portions of the sheet glass remote from close contact with forming walls at the surface of the glass. Of course the walls of my segregating member may be so spaced as to prevent warping tendencies in the drawn sheet glass, but sufficiently remote to avoid direct forming contact, so as to avoid tendencies to mar the drawn sheet glass.

Secondly, the temperature control of the portions of the glass from which the sheet edges take form with respect to the closely spaced refractory walls extending into the glass to maintain constant commercial width in the drawn sheet, and cause said edges or margin portions thereof to form in substantially finished reduced drawn thickness and in close forming contact between said closely spaced walls, this because of the greatly diminished breadth of the portions of the glass supplied upwardly between said closely spaced walls 49'.

The portions of the glass between said closely spaced walls at points of anchorage 49 or 49' being somewhat anchored so that by stretching during drawing, said glass forms in drawing lines and in required finished draw thickness. Another factor being to maintain the temperature of the sheet edges or margin forming members, also the glass adjacent the points of departure of the drawn margins of the sheet adjacent to said closely spaced walls, sufficiently high to avoid undue thickness formation in the drawn glass at such points obtaining uniformity of texture and temper in said drawn glass.

The lowering of the anchors or segregating member in immersed position or depth with their upper edges of wall at or adjacent the surface of the glass bath, affords means permitting the furnace heat to pass beneath the slightly raised shield members to the immediate portions of the glass in contact with or adjacent to the inner surfaces of wall of said anchors or segregating member, thereby maintaining the quality and homogeneity of the glass at such points including the portion of the glass from which the sheet is being drawn, at the same time retaining the advantage of having a segregating pool or stratum of glass maintained in required drawing temperature.

I claim—

1. The herein described method of drawing sheet glass with an anchoring means having a narrow slot therein formed between opposed walls inclined toward one another to define an acute angle, which consists in first drawing the sheet in continuous form from a substantially constant open bath of molten glass, drawing the marginal portion of the meniscus which forms the sheet upwardly through said slotted anchoring means to partially reduce the thickness thereof and the remaining portion of the sheet from the free normal surface of the open bath, causing each successive marginal portion of the sheet being drawn to adhere to the walls of the slot in said anchoring means for maintaining the desired width of the sheet, and finally upwardly freely stretching said forming marginal portion of the sheet in final reduced thickness above said anchoring means.

2. The process of forming sheet glass which consists in drawing the sheet from a substantially constant normal surface of an open bath of molten glass, passing the thickly drawn marginal portions of the forming sheet through slotted hot anchorage means, dragging the border faces of the drawn marginal portions of the forming sheet in adhesive contact against the surfaces of the slots in said anchorage means, maintaining the rising marginal portions at all adherent points of contact to said anchorage means in greater thickness than that of the finished thickness of the sheet thereabove, stretching said border portions in final reduced thickness above said anchorage means, shielding the rising marginal portions of the forming sheet from the rising heat of the bath, and regulating the thickness of the forming marginal portions of the sheet by varying the adherent dragging action of the border faces upon said anchorage means.

3. The process of forming sheet glass which consists in drawing the sheet from a bath of molten glass, causing the sheet border producing portions of the glass to pass in shaping contact between upwardly converging guiding means while maintaining said means against any movement, and drawing the border portions of the sheet in final reduced thickness from the glass passing above said upwardly converging means while at the same time drawing the remaining portion of the sheet from the free surface of the bath.

4. The process of forming sheet glass which consists in drawing the sheet from a bath of molten glass, and positively upwardly and outwardly tapering the border producing portion of the glass by passing said portions of the glass in shaping contact upwardly through normally immovable guiding means while at the same time maintaining said means at a temperature such as to cause the adherence of the glass contacting therewith, and drawing the remaining portion of the sheet from the free surface of the glass bath.

5. The process of drawing sheet glass from a substantially open bath of molten glass contained in a heated chamber, which consists in segregating a long narrow layer of glass at drawing temperature within the bath, drawing the sheet from said layer of glass and from the free surface of the bath, applying an adherent dragging force upon the border faces of the thickly drawn meniscus which forms the sheet to shape the border faces and maintain the desired width of the sheet, shielding the rising sheet from heat within said chamber but admitting heat in predetermined quantities from said chamber to the glass adjacent to the source of the sheet during drawing, maintaining the rising border portions of the meniscus in greater thickness at all points of application of said adherent dragging force than that of the finished thickness of the sheet, and finally freely stretching the said thickly drawn border portions of the meniscus in final reduced thickness above the points where the adherent dragging force is applied to the border faces of the rising glass to form the border portions in final reduced thickness.

6. An apparatus arranged for drawing a sheet of glass from a bath of molten glass, including a normally fixed hot member having a narrow open flared slot formed therein to receive the sheet border producing portion of the glass, said member contacting with and adhering to the marginal portion of the forming sheet and the walls of the slot terminating at the inner marginal portion of the sheet.

7. In apparatus arranged for drawing a sheet of glass from a substantially open bath of molten glass, a normally fixed hot means disposed spaced above the bottom of the bath at each border portion of the sheet, said means having each a narrow slot opening through the top, side and bottom thereof to receive the sheet border producing portions of the glass, the walls forming the slots in said means flaring toward the side openings of the slots and terminating at the inner marginal portions of the sheet, and said walls contacting with and adhering to the border faces of the forming sheet to maintain the desired width of the sheet.

8. An apparatus for drawing sheet glass from a substantially open bath of molten glass, and a drag member disposed at each border portion of the sheet and having each a narrow slot formed therein opening through the top, side and bottom of the member to receive the sheet border producing portions of the glass and contacting therewith, the slot flaring toward its bottom opening to facilitate the upward movement of the glass and the walls of the slot terminating at the inner marginal portion of the sheet.

9. An apparatus arranged for drawing sheet glass from the normal surface of a bath of molten glass, including a normally stationary hot drag member disposed above the bottom of the bath at each border portion of the sheet, said members having each an upwardly extending narrow slotted passage formed therein opening through the top, side and bottom of the member to receive the relatively thick sheet border producing portion of the glass, the walls forming the slotted passage in said members contacting with and adhering to the glass passing upwardly therethrough to maintain the desired width of the sheet and terminating at the inner marginal portions of the forming sheet thereby protecting the border portions being drawn from rising heat of the bath, the slotted passage being unrestricted at its open side and flared toward its botttom opening to facilitate the upward movement of the glass, and the top opening of the slotted passage being restricted to shape the glass of the forming border portions passing upwardly therethrough in partially reduced thickness for stretching during drawing.

10. An apparatus arranged for drawing sheet glass from the normal surface of a bath of molten glass, and an edging member having a flared slot formed between curved walls and opening through the top, side and bottom of the member, said member being disposed to embrace the sheet border producing portions of the glass and terminating at the inner marginal portion of the sheet.

11. An apparatus for drawing sheet glass from a bath of molten glass, and a drag member disposed at each border portion of the sheet, said drag members having each a slot formed therein and opening through the top, side and bottom of the member to receive the sheet border producing portions of the glass and contacting therewith, the walls forming the slot being flared and downwardly outwardly curved to facilitate the upward movement of the glass, the upper opening of the slot being restricted to control the thickness of the rising border portion of the sheet and the walls of the slots terminating at the inner marginal portions of the sheet.

12. An apparatus arranged for drawing sheet glass from a substantially constant open bath of molten glass, including a normally fixed hot drag member disposed at each border portion of the sheet, each of said drag members having an open slot to receive the thickly drawn border portions of the forming sheet and contacting with and adhering to the thickly drawn marginal portion of the forming sheet to maintain the desired width of the sheet, and individual adjustable shielding means spaced above the bath adjacent to said drag member for regulating the temperature of the forming border portion of the sheet.

13. An apparatus for drawing sheets of glass from a substantially open bath of molten glass, including hot anchoring members for maintaining the width of the sheet, each anchoring member having spaced apart walls disposed so as to form an open narrow slot defining an acute angle and gradually increasing in width toward its open end to receive the edge and border portion of the forming sheet and engage the rising meniscus forming said edge and border portion with an adherent dragging action, said anchoring members having temperature controlling pockets formed therein, 14. An apparatus arranged for drawing sheet glass from a bath of molten glass, including a hot member having an upwardly extended narrow slotted passage formed therein open and flared at its side and disposed to receive the forming border portion of the sheet and contacting with and adhering to the rising border portion of the forming sheet, the walls of the slot extending to and terminating at the inner marginal portion of the sheet, said hot member further having an air pocket formed therein extending to and terminating adjacent the slotted passage for controlling the temperature of the glass passing upwardly therethrough during drawing.

15. An apparatus for drawing sheet glass from a bath of molten glass, including an edging member having an upwardly extended narrow slotted passage formed therein open at its top, side and bottom to receive the sheet border producing portion of the glass and contacting therewith, the walls of the slot flaring downwardly to facilitate the upward movement of the glass and extending to and terminating at the inner marginal portion of the forming sheet, the top opening of the slotted passage being restricted to shape and partially reduce the thickness of the glass, the edging member further having a temperature controlling pocket located and adjacent to the slotted passage in said edging member.

16. An apparatus for drawing sheet glass from a bath of molten glass, including an edging member having an open flared slot formed between curved walls and disposed to receive the sheet border producing portion of the glass and contacting therewith, said member also having a temperature controlling pocket formed therein and located adjacent to the slot in said member.

17. An apparatus arranged for drawing sheet glass from a substantially open bath of molten glass, including a hot drag member spaced above the bottom of the bath at each border portion of the sheet and having each a narrow slot formed therein opening through the top, side and bottom of the member for receiving the thickly drawn border portion of the sheet and disposed in adjacent contact with said border portion to maintain the desired width of the sheet, the walls forming the slot being flared toward both the side and bottom opening of the slot to facilitate upward movement of the glass and terminating at the inner marginal portion of the forming sheet to thereby protect said portion from rising heat from the bath, the top opening of the slot being restricted to shape and partially reduce the thickness of the glass passing upwardly therethrough in predetermined thickness but said slot being greater in width at all adherent dragging points of contact of the glass to the walls of the slot than the finished thickness of the sheet, said member further having an open temperature controlling air pocket adjacent said slot, and means for holding said drag member in desired fixed position during drawing.

18. In combination with an apparatus arranged for drawing sheet glass from a substantially constant open bath of molten glass, including a hot drag member having a slot opening through the side thereof to receive the thickly drawn border portion of the forming sheet, the walls forming the slot contacting with and adhering to the forming border portion of the sheet to prevent the narrowing of the sheet and extending to and terminating at the inner marginal portion of the sheet to protect the rising portion from heat of the bath, said walls being sufficiently spaced apart so that the slot will be wider at all adherent dragging points of contact with the glass than the finished thickness of the sheet border above the slot, said member having an open pocket therein adjacent to said slot, a hollow metallic device engaging said pocket including means for circulating and controlling a temperature affecting medium through said device, and means for holding said device in desired adjusted fixed position during drawing.

19. In combination with an apparatus for drawing sheet glass, a tank adapted to receive a substantially constant open bath of molten glass from which to draw the sheet, means normally out of contact with the base of the sheet for segregating a long narrow layer of glass in the bath transversely of the sheet, shielding means spaced above the bath at each side of the forming sheet transversely thereof, slotted hot edging members adherently engaging the forming border portions of the sheet above the bath, and means for adjusting said segregating means and slotted edging members in desired fixed position during drawing.

20. In apparatus for drawing sheet glass from a bath of molten glass, a float having long substantially parallel walls forming a slot immersed in the bath for segregating a layer of glass from which to draw the sheet, the walls forming the intermediate portion of the slot being disposed remote from direct shaping contact with the base of the sheet, and the end portions of said walls at the border portions of the sheet being more closely spaced to each other to define an acute angle and contacting with the border faces of the forming sheet above the bath.

In testimony whereof, I affix my signature.

ARTHUR E. SPINASSE.